Jan. 25, 1966
W. A. KEALY ETAL
3,230,771
TEMPERATURE MEASURING APPARATUS
Filed July 23, 1962
2 Sheets-Sheet 1
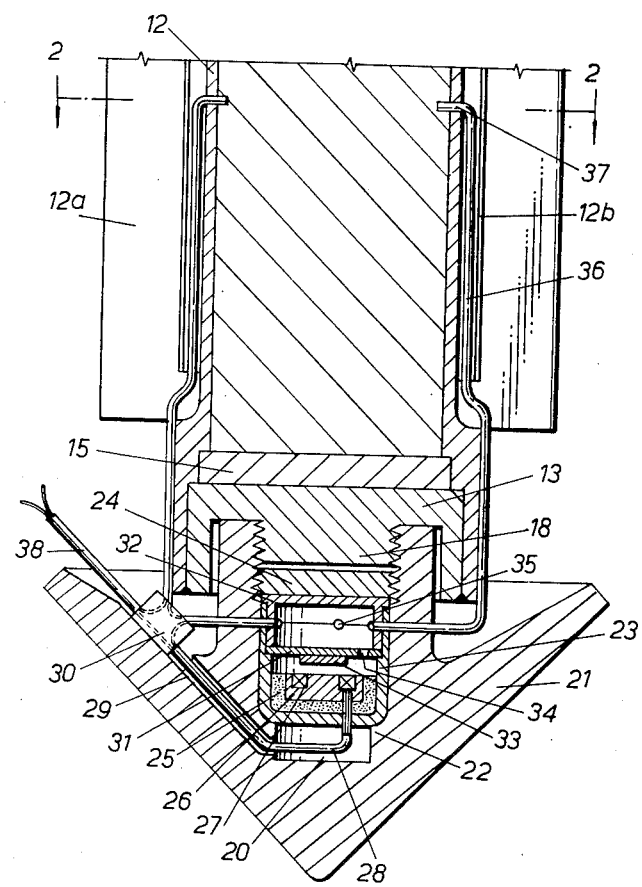
—FIG. 1.—

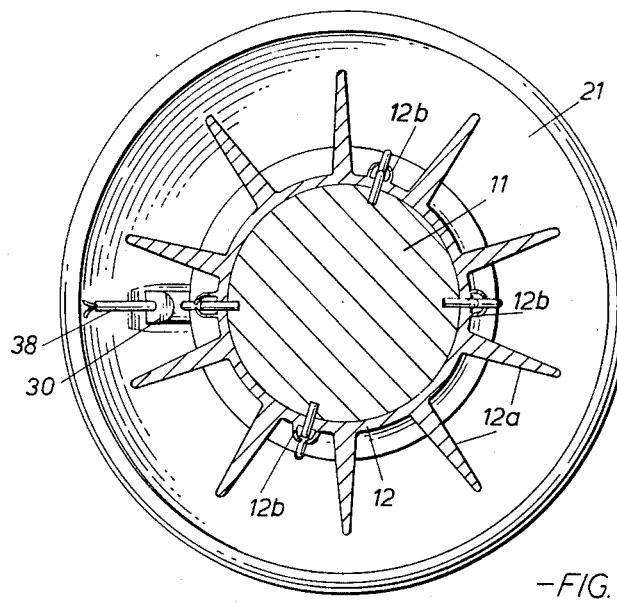
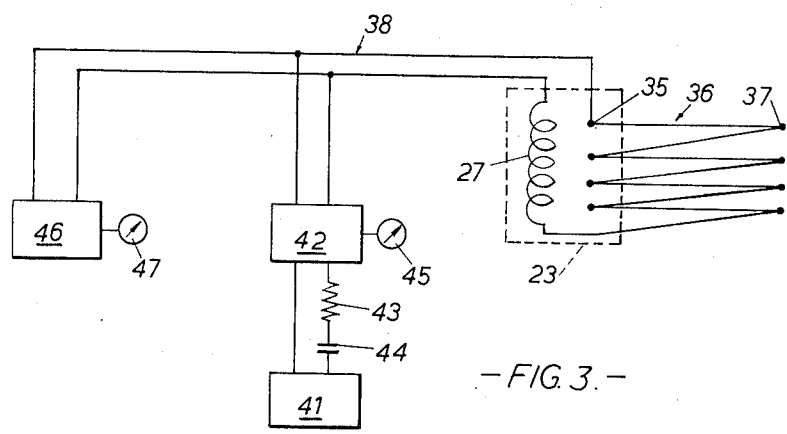

United States Patent Office 3,230,771
Patented Jan. 25, 1966

3,230,771
TEMPERATURE MEASURING APPARATUS
Wellesley Ashe Kealy, Lymm, and Richard Smart, Urmston, Manchester, England, assignors to United Kingdom Atomic Energy Authority, London, England
Filed July 23, 1962, Ser. No. 211,642
Claims priority, application Great Britain, Aug. 3, 1961, 28,184
2 Claims. (Cl. 73—340)

This invention relates to temperature measuring apparatus and has one application to the measurement of temperature at the surface of a fuel element for a nuclear reactor.

In our copending U.S. patent application Serial No. 175,495 (Kealy et al.) there is described and claimed temperature measuring apparatus comprising a diaphragm having a resonant frequency dependent upon the fluid pressure imposed upon it, means for oscillating said diaphragm through a range of frequencies including its resonant frequency, and means for measuring the frequency of resonance. This apparatus has the advantage over thermocouples which are conventionally used that its leads are not liable to introduce errors into measurements. Thermocouples can be rendered unreliable if their leads incorporate joints of different materials, for example where the leads are passed through a pressure tight shell surrounding a reactor core. Spurious E.M.F.'s are generated at these joints if there are temperature differences across the joints. These E.M.F.'s may be reduced, where practicable, by employing materials which are thermo-electrically identical for the whole length of a thermocouple lead but this is not always possible. Furthermore, neutron irradiation of the leads may render material dissimilar which were initially thermo-electrically identical. Spurious E.M.F.'s may even be generated in a single continuous lead if a section of the lead is irradiated so that the thermo-electric properties of the lead vary along its length.

Nevertheless, thermocouples do have advantages in the measurement of temperature, particularly by their small size and rapid thermal response.

Accordingly the present invention provides, in one of its aspects, temperature measuring apparatus comprising a device energisable by an alternating signal to indicate the temperature of a reference point, a thermocouple whose direct current signal indicates the temperature differential between the reference point and another point, and connections for combining the alternating signal with the direct current signal from the thermocouple.

Preferably the device energisable by an alternating signal comprises a fluid filled chamber with which one junction of the thermocouple is in thermal contact, a diaphragm within the chamber, an electromagnetic coil for vibrating the diaphragm, the frequency of the diaphragm being dependent upon the temperature of the fluid within the chamber and being detectable by the effect of resonance on the electrical impedance offered by the coil.

In one embodiment of the invention the alternating signal device is secured to a nuclear reactor fuel element to indicate the temperature of a reference point on the element, and the thermocouple has one junction at the surface of the element so that it indicates the temperature differential between the reference point and the surface of the element. Preferably a plurality of thermocouples are provided each having a junction at the surface of the element, the thermocouples being connected in series.

In apparatus according to the present invention dissimilar thermocouple leads are only required to extend a short distance and need have no joints in them. The longer leads from the device energisable by an alternating signal may be of identical material so that any E.M.F.'s generated at irradiated sections of the leads will balance out. Where a plurality of thermocouples are employed, an average temperature is derived and errors are reduced owing to the larger signal generated by the thermocouples.

One embodiment of apparatus according to the invention will now be described by way of example with reference to the accompanying drawings in which:

FIGURE 1 shows a diagrammatic section through the lower part of a nuclear fuel element equipped with apparatus embodying the invention, FIGURE 2 is a section on the line 2—2 of FIGURE 1, and FIGURE 3 shows a block diagram of the electrical connections of the apparatus.

In this embodiment, a nuclear fuel member 11 (FIGURES 1 and 2) is enclosed in a magnesium alloy sheath 12 having longitudinal heat transfer fins 12a and locating fins 12b. The sheath 12 is sealed at its lower end by an end cap 13. The fuel member is spaced from the end cap by a heat insulating disc 15. The end cap has a threaded boss 18 onto which is screwed an end fitting 21 which co-operates with an end fitting at the upper end of another element (not shown) to enable a series of fuel elements to be stacked in a column. The end fitting is hollowed to form a cavity 20 with an internal shoulder 22. A transducer capsule 23 bears against the shoulder 22 and is retained in the cavity by a screwed disc 24. The capsule which is sealed is filled with a suitable fluid such as helium gas. Within the capsule a block 25 of electrically insulting material mounts a soft iron core 26 around which an electromagnetic coil 27 is wound. Electrical leads 28 from the coil 27 are taken through a bore 29 in the end fitting to a junction box 30 welded to the end fitting. Within the capsule a diaphragm 31 is clamped between an internal shoulder of the capsule and a screwed ring 32. The diaphragm carries a small soft iron armature 33 which can be influenced by the electromagnet 26, 27. An aperture 34 through the diaphragm allows balance of the fluid pressures on either side of the diaphragm.

The diaphragm 31 has a resonant frequency which is dependent upon the pressure of the fluid in which it is situated and therefore on the temperature of this fluid. Accordingly, the temperature of the fluid, which provides a reference point for the fuel element, can be obtained by detecting the resonant frequency of the diaphragm and this is indicated by an increase of the apparent impedance of the coil 27 which drives the resonating diaphragm.

Four thermocouples, connected in series, are constituted by four cold junctions 35 (of which only three are shown in FIGURE 1) positioned within the capsule so as to be in good thermal contact with fluid filling the capsule, four thermocouple cables 36 (of which only two are shown in FIGURE 1) which are taken out through the walls of the capsule in a sealed manner and laid along the side of the fuel element being protected by locating fins 12b bent over the cables, and four hot junctions 37 (of which only two are shown in FIGURE 1) which are formed at the ends of the thermocouple cables and which are embedded in the surface of the fuel element. The thermocouples are of the "Chromel"/"Alumel" type. Three of the cables 36 are taken straight to the hot junctions; the fourth cable is interrupted at the junction box 30. Output leads 38 are taken from the junction box.

The electrical connections for the apparatus are shown diagrammatically in FIGURE 3 in which it can be seen that the four thermocouples are connected in series with each other and with the coil 27 and the output leads 38. The four hot junctions 37 are positioned at a locality defined by a common circumference on the surface of the fuel element. The four junctions at the surface of the element are spaced apart so that the direct current signal in the series connected thermocouples is related to the average temperature at the locality of the surface of the element and indicates a temperature differential between the capsule and the locality.

In operation, detection of the resonant frequency of the diaphragm 31 in the capsule is effected by means of an oscillator 41 and a detector 42 connected in series with the output leads 38 (FIGURE 3). The oscillator applies an oscillating signal of known frequency to the coil 27 through a high resistor 43 which maintains the signal current constant and through a capacitor 44. The frequency of the oscillator output is swept over a frequency band while an indicator 45 associated with the detector is watched. The indicator indicates the impedance offered by the coil 27 which rises to a peak when the diaphragm 31 is resonating. The frequency at which the diaphragm resonates is measured and this indicates the temperature of the capsule.

The thermocouples being connected in series with the resonator coil superimpose upon the alternating signal their own direct current component, this component being filtered out by the capacitor 44 between the detector and the oscillator. The direct current component is taken to a high impedance direct current amplifier 46 connected in parallel with the detector 42; this amplifier is provided with filters to prevent interference between the amplifier and the oscillator 41. The direct current component is indicated by an indicator 47 associated with the amplifier. By combining the temperature of the capsule, as indicated by the alternating component of the signal in the leads 38, and the temperature differential between the capsule and the surface of the fuel element, as indicated by the direct component of the signal in the leads, the temperature at the surface of the fuel element can be derived.

The combination of the direct and alternating signals provides that only a single pair of electrical output leads 38 need be taken from the fuel element out through a reactor pressure vessel. This single pair of electrical leads may incorporate joints and breakable contacts without risk of introducing spurious E.M.F.'s; accordingly, there may be substituted for the leads 38 shown in FIGURE 1, breakable contacts which might be, for example, studs mounted on the end fitting 21 for engagement with an adjacent fuel element.

The invention is not limited to the details of the foregoing example; for instance the capsule need not be located in the end cap of a fuel element, but could be located on the splitter fins of an element. Furthermore, the apparatus can be used to measure, for example, the temperature of a gas turbine exhaust or temperatures of turbine rotor blades. Moreover, it is envisaged that the device energisable by an alternating signal need not be a diaphragm resonator but could be an acoustic resonator such as an organ pipe resonator, the Helmholtz resonator or a whistle resonator.

What we claim is:

1. A nuclear reactor fuel element provided with temperature measuring apparatus comprising a fluid-filled chamber, a diaphragm within the chamber, an electromagnetic coil for vibrating the diaphragm, the resonant frequency of the diaphragm being dependent upon the temperature of the fluid within the chamber and being detectable by the effect of resonance on the electrical impedance offered by the coil, a thermocouple having one junction in thermal contact with the surface of the element and the other junction in thermal contact with the fluid-filled chamber so that it indicates by a direct current signal the temperature differential between the surface of the element and the fluid-filled casing, and connections for combining an alternating signal from the coil with the direct current signal to provide a single output signal from the apparatus.

2. A reactor fuel element provided with temperature measuring apparatus comprising a fluid-filled chamber, a diaphragm within the chamber, an electromagnetic coil for vibrating the diaphragm, the resonant frequency of the diaphragm being dependent upon the temperature of the fluid within the chamber and being detectable by the effect of the electrical impedance offered by the coil, a plurality of thermocouples connected in series each having one junction in thermal contact with the fluid-filled chamber and another junction in thermal contact with the surface of the element, and connections for combining an alternating signal from the coil with the direct current signal from the thermocouples to provide a single output signal from the apparatus.

References Cited by the Examiner

UNITED STATES PATENTS

| | | | |
|---|---|---|---|
| 2,475,238 | 7/1949 | Hall et al. | 73—361 |
| 2,536,025 | 1/1951 | Blackburn | 73—362 |
| 2,568,277 | 9/1951 | Eltgroth | 73—24 |
| 2,641,931 | 6/1953 | Wild | 73—361 |
| 2,769,340 | 11/1956 | Bernreuter et al. | 73—361 |
| 3,087,886 | 4/1963 | Robinson | 73—362 |

DAVID SCHONBERG, *Acting Primary Examiner.*

ISAAC LISANN, LOUIS R. PRINCE, *Examiners.*

STEVEN H. BAZERMAN, *Assistant Examiner.*